United States Patent [19]

Szymanski

[11] Patent Number: 5,423,357

[45] Date of Patent: Jun. 13, 1995

[54] APPARATUS FOR CUTTING INTERLOCKING JOINTS

[75] Inventor: Donald Szymanski, Prospect, Ky.

[73] Assignee: Vermont American Corp., Louisville, Ky.

[21] Appl. No.: 255,000

[22] Filed: Jun. 7, 1994

[51] Int. Cl.6 .............................................. B27C 5/00
[52] U.S. Cl. ............................ 144/144.5 GT; 33/197;
33/561; 144/87; 144/373; 144/144.5 R; 269/41;
269/221
[58] Field of Search ................. 33/197, 539, 561, 562;
144/27, 84, 85, 87, 144 R, 144 S, 144.5 GT, 373;
269/41, 221; 409/125, 130

[56] References Cited

U.S. PATENT DOCUMENTS

| | | | |
|---|---|---|---|
| 2,764,191 | 9/1956 | Hartmann | 144/87 |
| 3,109,466 | 11/1963 | Jones | 144/144.5 R |
| 3,800,840 | 4/1974 | McComb, Jr. | 144/87 |
| 4,373,562 | 2/1983 | Vernon | 144/144.5 R |
| 4,405,004 | 9/1983 | Dicke | 144/87 |
| 4,407,344 | 10/1983 | Dicke | 144/87 |
| 4,428,408 | 1/1984 | Grisley | 144/144.5 R |
| 4,552,193 | 11/1985 | Ammas | 144/144.5 GT |
| 4,607,673 | 8/1986 | McComb, Jr. | 144/144.5 R |
| 5,123,463 | 6/1992 | Grisley | 144/144.5 GT |
| 5,285,832 | 2/1994 | Gibson | 144/144.5 R |

*Primary Examiner*—W. Donald Bray
*Attorney, Agent, or Firm*—Middleton & Reutlinger; Charles G. Lamb

[57] ABSTRACT

An apparatus for supporting and guiding a router in cutting work-pieces to form an interlocking joint comprises a base support member to which two work-pieces are mounted, at least one being in a horizontal plane. A template is also mounted to the base support member above the horizontal positioned work piece. The template is adjustably connectable to the base support member and vertical and horizontal work-piece clamping assemblies are provided with a movable clamping device so that clamping pressure is applied adjacent to each work-piece in holding the work-pieces on the base support member for cutting.

12 Claims, 7 Drawing Sheets

APPARATUS FOR CUTTING INTERLOCKING JOINTS

BACKGROUND OF THE INVENTION

The present invention relates to an apparatus for cutting mechanically interlocking joints in non-metallic work-pieces, particularly wood work-pieces. More specifically, the present invention provides an apparatus for cutting different configurations of mechanical interlocking joints with a router.

In the joining of two pieces of wood or other non-metallic materials, various types of joints are utilized. In the joining of two work-pieces at a 90° angle to form a box-like structure, the most common joints are those known as blind, half-blind, and open "dove-tail" joints, "box-cut" and "mortise and tenon" joints. In connecting pieces of work-pieces end-to-end, "box-cut" type joints are utilized as well as those referred to in the art as "finger joints". Finger joints are particularly useful in splicing two work-pieces together.

These joints are routinely made utilizing hand held routers which follow templates or patterns which overlay each work-piece to be routed. Many of these devices and apparatuses presently known in the art which are used in conjunction with routers are hard to adjust in the alignment of the work-pieces with appropriate templates and in many instances, only one work-piece can be cut at a time. Moreover, most apparatuses have limited usage and cannot be used for various types of cuts with various thicknesses of work-pieces.

SUMMARY OF THE INVENTION

An object of the present invention is to provide an apparatus for cutting joints in work-pieces which is portable and easily manipulated in cutting work-pieces which are to be joined together.

Another object of the present invention is to provide an apparatus for cutting joints in work-pieces which includes means to position the pieces to be joined wherein the cutting of the two pieces to be joined are done simultaneously, or separately depending on the type of joint to be cut.

A further object of the present invention is to provide an apparatus for cutting joints in work-pieces with improved clamping means for holding the work-pieces for cutting.

An even further object of the present invention is to provide an apparatus for cutting joints in work-pieces having an improved depth positioning means.

Also, another object of the present invention is to provide an apparatus that enables fitting pieces of different thicknesses together in an open dove-tail cut.

More particularly, the present invention is directed to an apparatus for supporting and guiding a router for cutting work-pieces to form an interlocking joint comprising:

a base support member;

a template vertically adjustably connectable to said base support member;

a vertical work-piece clamping device mounted onto said base support member including a pair of vertical work-piece clamping assemblies, said clamping assemblies being in spaced adjustable relation with each other;

a horizontal work-piece clamping device mounted onto said base support member including a pair of horizontal work-piece clamping assemblies, said clamping assemblies being in spaced adjustable relation with each other; and, adjusting means to position said template in relation to said work-pieces.

These and other advantages of the present invention will become apparent to those skilled in the art upon reference to the following detailed description.

BRIEF DESCRIPTION OF THE DRAWINGS

The description refers to the accompanying drawings in which like parts are given like reference numerals and wherein:

FIG. 6 is a perspective view of a template for making the interlocking joint of FIG. 6a;

DETAILED DESCRIPTION OF THE PREFERRED EMBODIMENT

Figure 1:
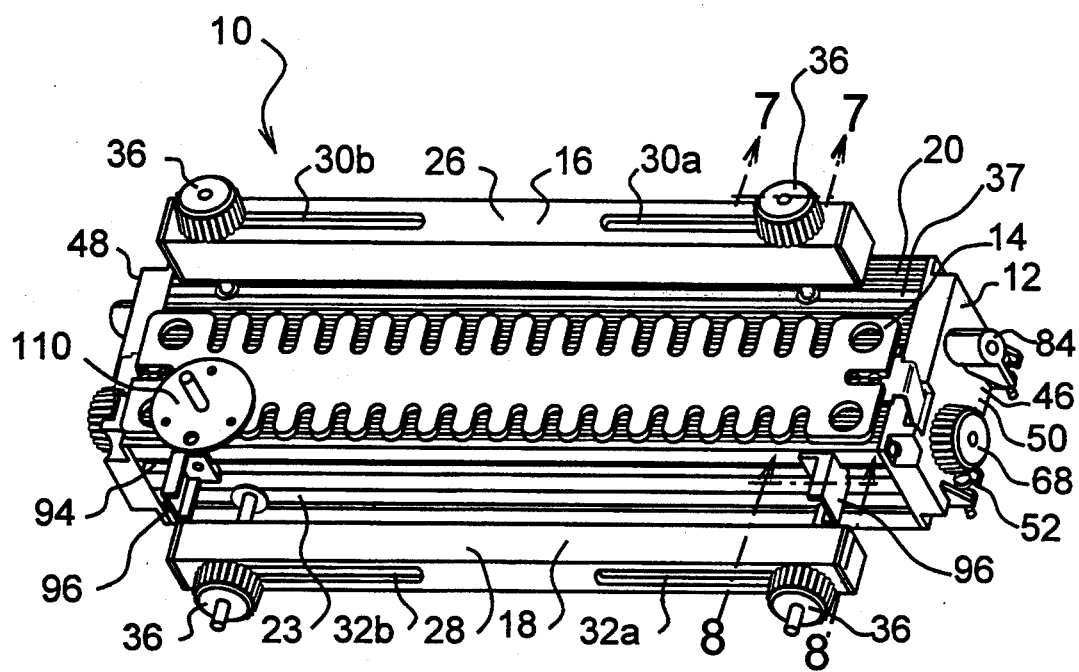
FIG. 1 is a perspective view of a preferred apparatus of the present invention.
Figure 2:
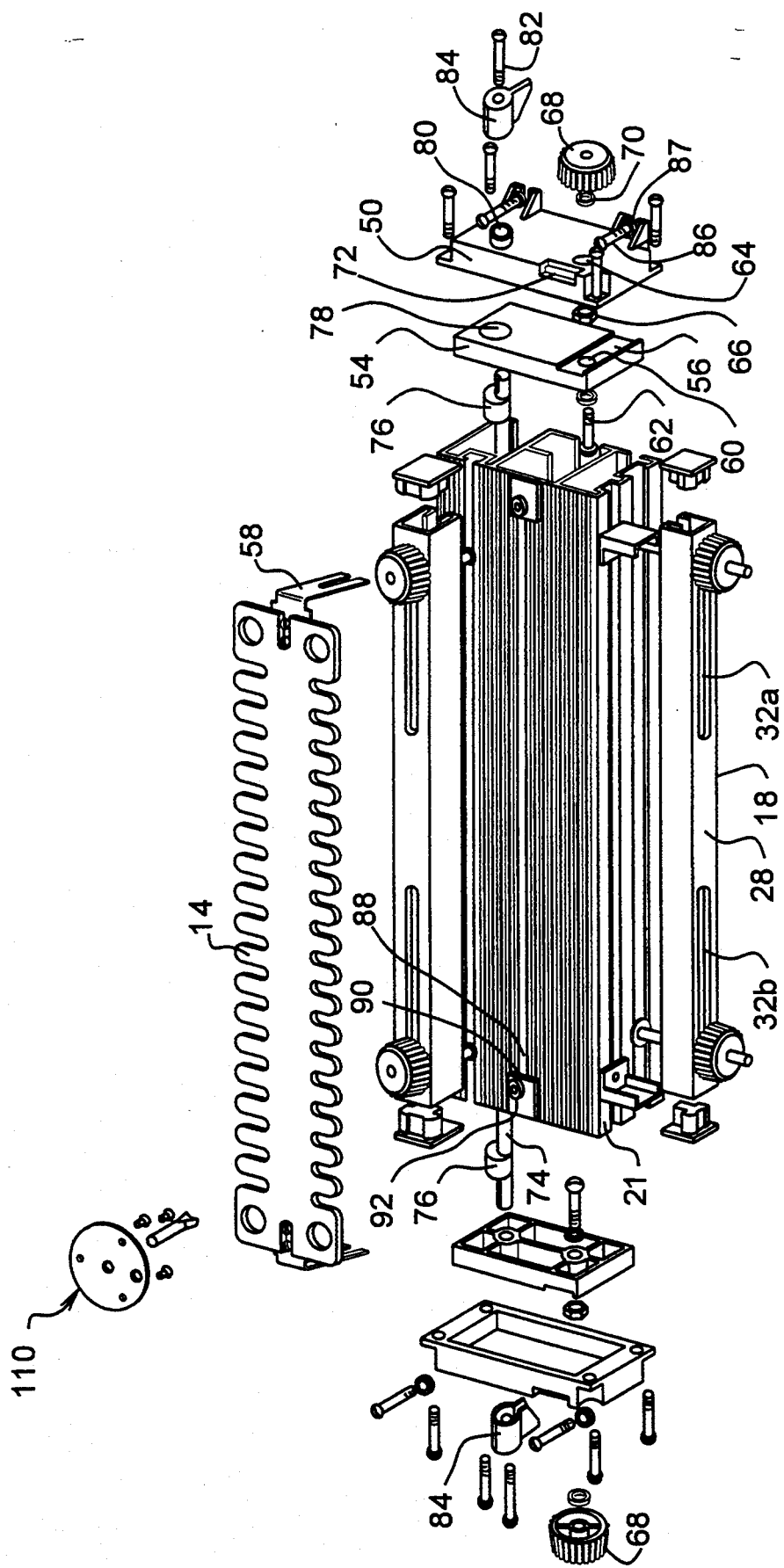
FIG. 2 is an exploded view of the preferred embodiment of the present invention.

As best seen in FIGS. 1 and 2, the preferred embodiment of the apparatus of the present invention is designated by the numeral 10. The apparatus 10 includes a base support member 12 to which a template 14 and clamping devices 16 and 18 are mounted. A top surface 20 is provided on the base support member 12 upon which a first work-piece 22 (FIG. 3) is received and supported. The top surface 20 may be generally flat and smooth or it may be provided with grooves therein as shown in FIGS. 1 and 2 which provides for better gripping action on the work-piece. A front surface 21 is provided for receiving and supporting work-piece 24 (FIG. 3) and work-pieces 122, 124 (FIG.

Figure 7:
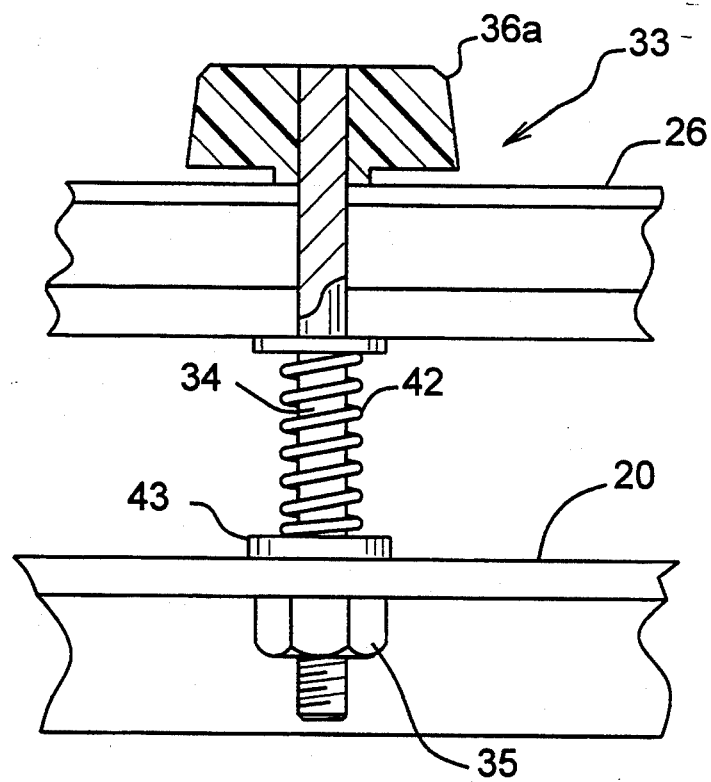
FIG. 7 is an enlarged sectional view taken along lines 7—7 of FIG. 1.

The clamping devices 16 and 18 include longitudinally extending channel-shaped members 26 and 28, respectively. The channel-shaped members 26 and 28 are each provided with a pair of elongated openings 30a, 30b in member 26 and openings 32a, 32b in member 28 for receiving adjustable screws 34 of clamping assemblies 33 (FIG. 7) therethrough. As shown in FIG. 7, adjustable screws 34 are fixedly attached to clamping knobs 36 on one end and threaded female members shown as nuts 35 on the other end. Top surface 20 is provided with an elongated open slot 37 which extends longitudinally the length of the top surface 20 and receives adjustable screws 34 therethrough. Rotation of the clamping knobs 36 tightens or loosens channel-shaped member 26 thereby enabling the channel-shaped member 26 to be moved toward or away from base support member 12. A compression spring 42 is also provided to receive the adjustable screw 34 therethrough, the compression springs 42 being positioned between the channel-shaped member 26 and the top or front surface 20, 21 of the base support member 12. A washer 43 may also be provided.

Means for mounting clamping device 18 to the front surface 21 is substantially the same as the means for mounting clamping device 16 to top surface 20. The front surface 21 of the base support member 12 is provided with an elongated longitudinally extending opening 23 to receive adjustable screws 34 therethrough. The width of the opening 23 is just sufficient to receive the adjustable screws 34 therethrough with appropriate nuts 35 for the adjustable screws 34 being disposed on the opposite side of the front surface 21 for receiving the threaded ends of the adjustable screws 34.

Disposed on opposite ends of the base support member 12 are template support and positioning assemblies 46 and 48. The template support and positioning assemblies 46, 48 are disposed to receive the template 14 thereon and position the template at an appropriate position for over laying the work-pieces 22 and 24 prior to the cutting of the appropriate pattern in the work-pieces which make the interlocking joints.

The template support and positioning assemblies 46, 48 each include a housing 50 which is mounted to each end of the base support member 12 by appropriate mounting bolts 52. Received within the housing 50 is a movable template support and positioning plate member 54. The template support and positioning plate 54 is provided with a transversely extending groove 56 which receives the template bracket 58 therein. An opening 60 is provided through the groove 56 to receive a mounting bolt 62 therethrough which receives the template bracket 58 thereon. The template bracket 58 is of L-shaped construction with an open-ended slit at its lower extremity. Spacing between each leg of the slit is approximately equal to the diameter of the mounting bolt 62. The housing 50 is also provided with an oval-shaped opening 64 which aligns with the opening 60 in the template support and positioning plate 54. The opening 64 also receives the mounting bolt 62 therethrough. A stop nut 66 receives the mounting bolt 62 therethrough and is disposed between the housing 50 and the template support and positioning plate 54. One end of the mounting bolt 62 is attached to or received by a rotatable clamping knob 68 which is disposed on the outer surface of the housing 50. Washers 70 may also be provided for the mounting bolt 62. Rotation of the clamping knob 68 provides the means to tighten or loosen the template bracket 58 which is positioned upon the mounting bolt 62. Moreover, positioning bracket 58 up or down on mounting bolt 62 defines the vertical position or height of the template 14 in relation to the work-pieces.

The housing 50 is also provided with a rectangular-shaped opening 72 in the top thereof in alignment with the top of the groove 56 in the template support and positioning plate 54 for receiving the template bracket 58 therethrough.

The template support and positioning assemblies 46, 48 are inter-connected through the means of a pivot shaft 74 which extends longitudinally the length of the base support member 12. On each end of the pivot shaft 74 is a cam 76 which is received eccentrically within an opening 78 in the template support and positioning plate 54. An opening 80 is provided in the housing 50 in alignment with the opening 78 wherein the opening 80 receives one end of the cam 76 and a mounting bolt 82 therethrough. The mounting bolt 82 is attached to or received by the end of the cam 76 on one end and extends through a pivot handle 84 on the opposite end thereby connecting movement of cam 76 to the rotatable position of pivot handle 84. As the cam 76 is eccentrically located within the opening 78, movement or rotation of the pivot handle 84 moves the pivot shaft 74 horizontally, either toward or away from the vertical surface 21 of the base support member 12.

Housing mount bolts 86 and washers 87 are provided to attach or mount the apparatus to a work table or bench (not shown).

Means to position the work pieces 22 and 24 (FIG. 3) in cutting relation with each other are also provided. Centrally disposed in the top surface 20 of the base support member 12 is a longitudinally extending groove 88 which extends from each end of the base support member 12. A stop block member 90 is provided with a downwardly extending flange portion which fits within the groove 88 and is movable therealong. The movable stop block 90 is provided with a clamping knob 92 thereon which is rotable and fixedly connected to a threaded shaft portion, not shown, which extends through the stop block 90 and upon rotation of the clamping knob 92 engages with the groove 88 to maintain the stop block 90 in a movable or stationary position. The stop blocks 90 are utilized to position the work-piece 22 at a desired location in relation to the template 14.

Figure 8:
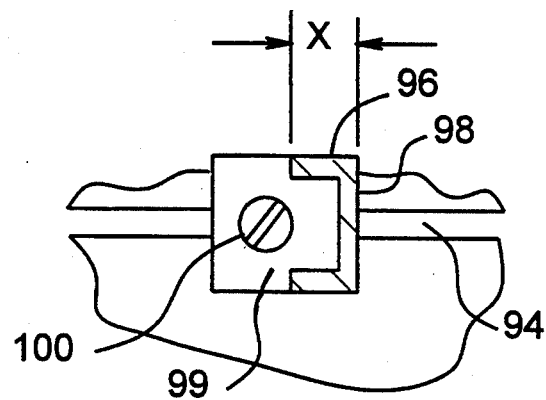
FIG. 8 is an enlarged sectional view taken along lines 8—8 of FIG. 1.

The front surface 21 of the base support member 12 is also provided with a longitudinally extending groove 94 therein which receives the front stop block members 96 therein. The front stop blocks 96 are provided with a preselected length "X" (FIG. 8) which is the length of the offset between the two work-pieces which are to be joined together. In a preferred embodiment, the front stop block 96 is an L-shaped member 98 with one leg 99 mounted for movement within the groove 94. A mounting and adjusting bolt 100 is provided for mounting the leg 99 with the groove 94 and upon tightening or loosening of bolt 100, stop block 96 is either movable or stationary.

Figure 5:
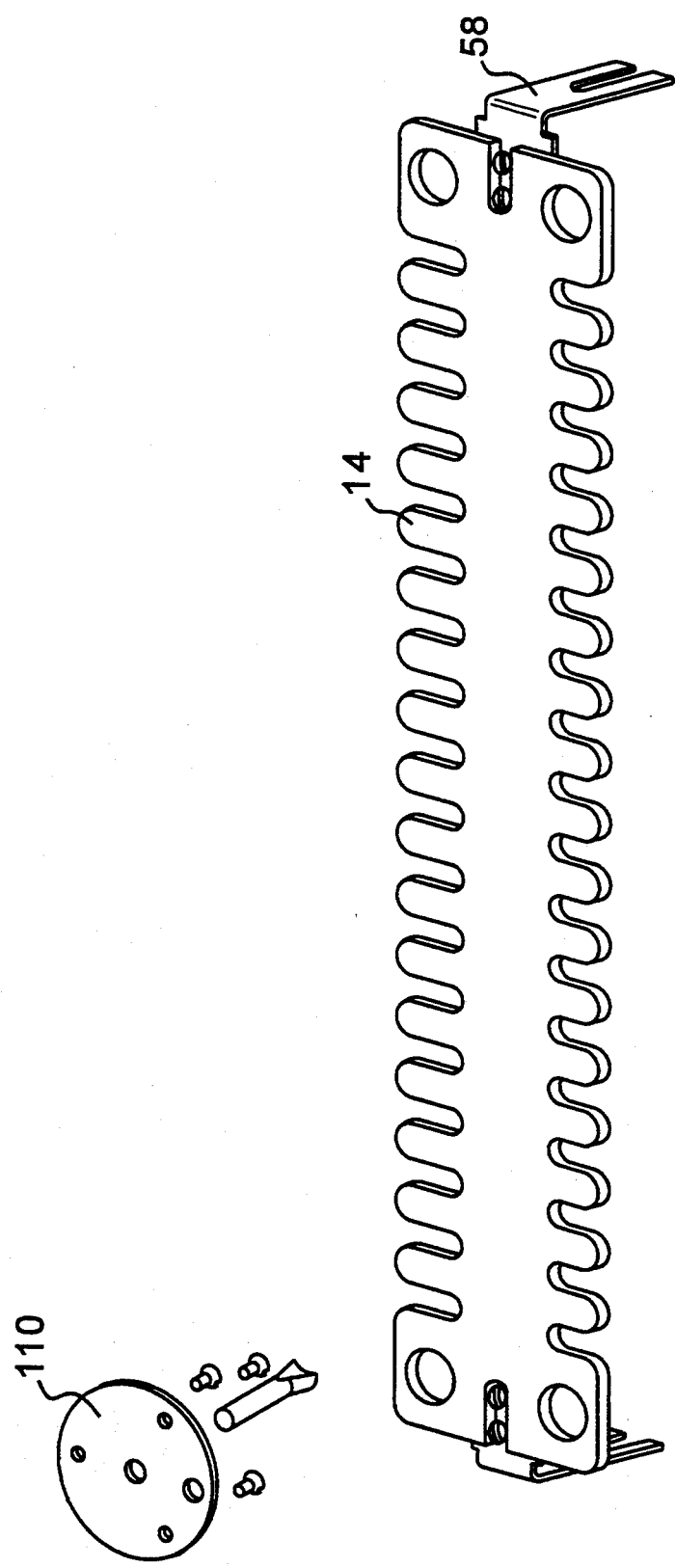
FIG. 5 is a perspective view of a template for use in making the dove-tail interlocking joint of FIG. 3.
Figure 6:
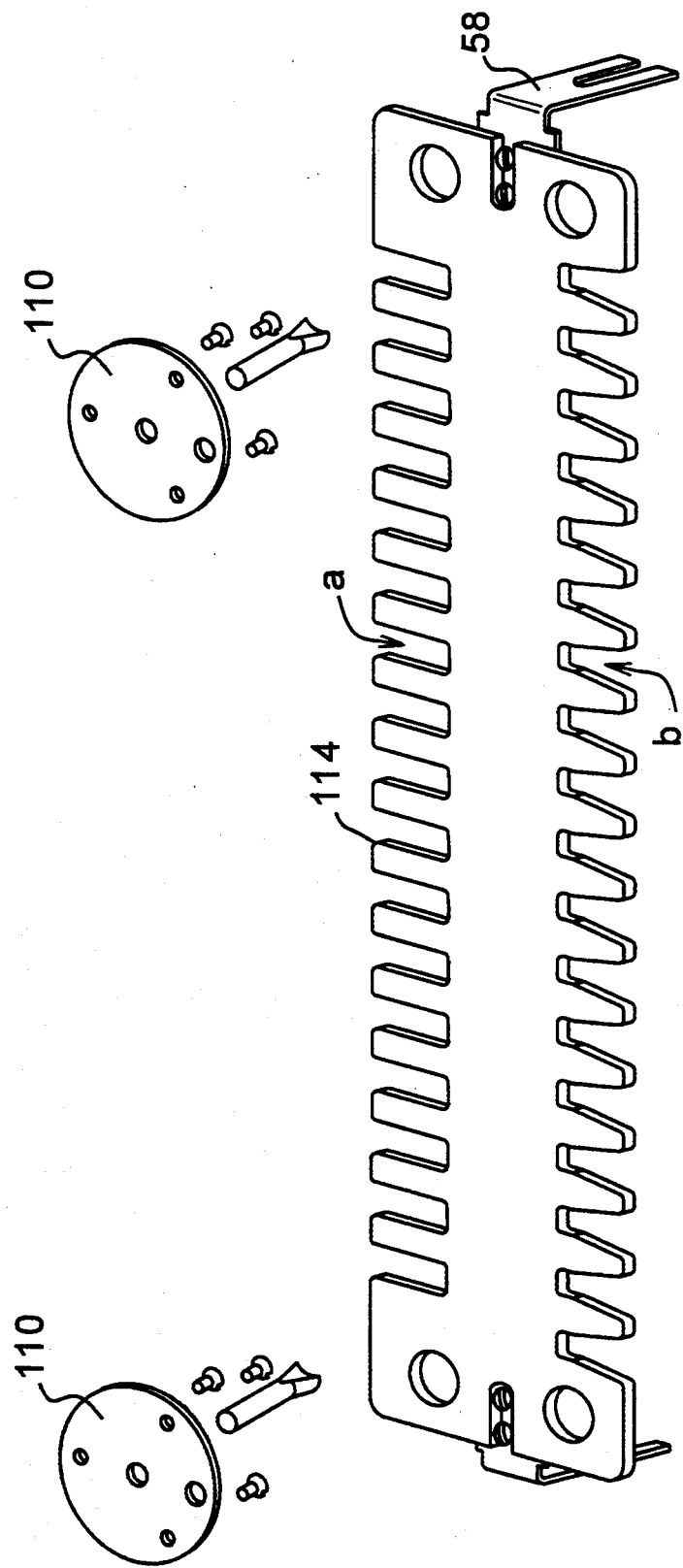

FIGS. 5 and 6 are examples of different types of templates which may be used with the present invention. FIG. 5 shows a template detail of the template 14 which is used in the detailed description of a preferred embodiment in FIG. 3 and FIG. 6 shows a template 114 used in FIG. 6a.

Figure 6A:
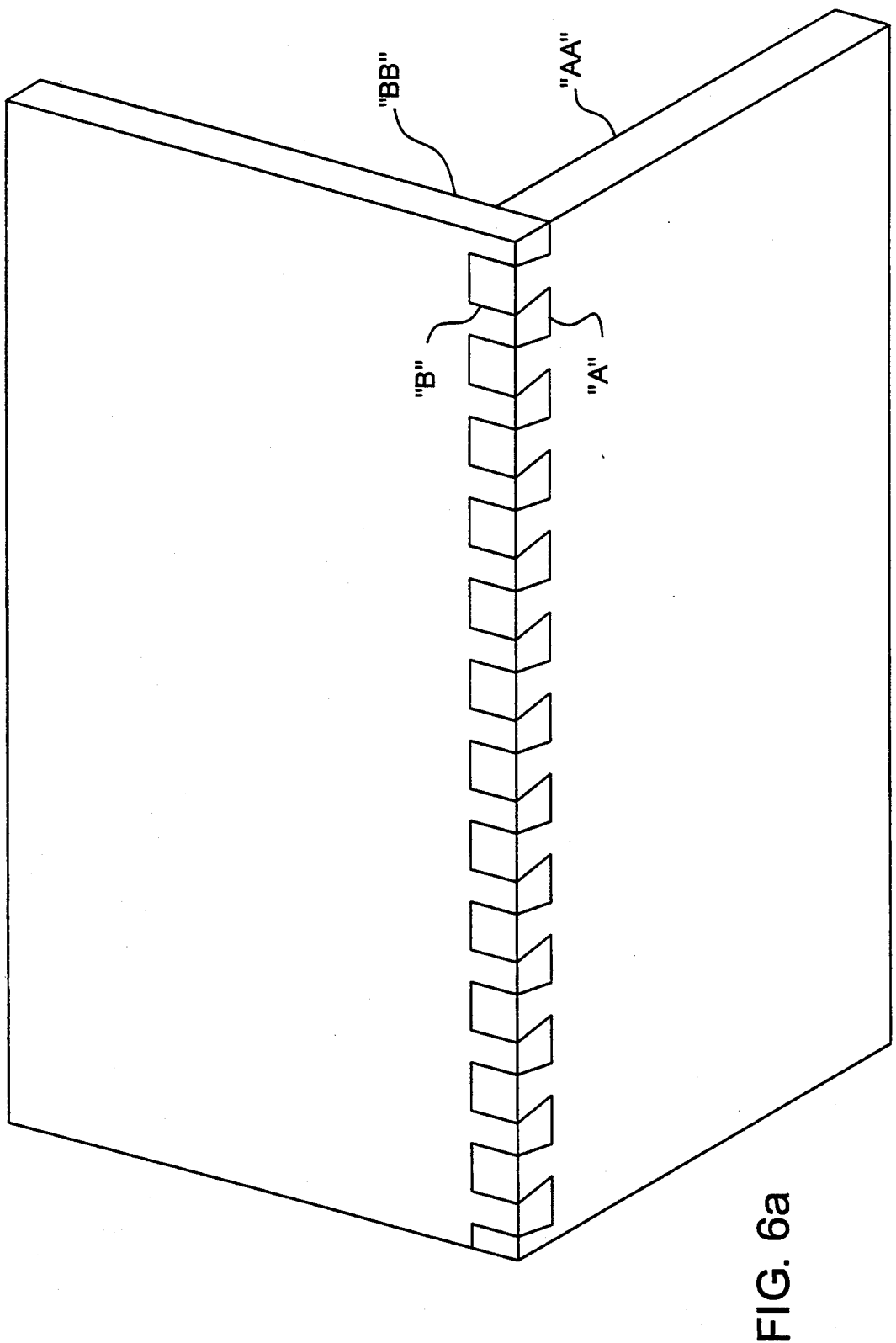
FIG. 6A is a perspective view of two joined work-pieces using the template of FIG. 6.

As shown in FIG. 6, template 114 is used to make two different cuts that result in an open dove-tail joints. One example of an open dove-tail joint made using template 114 is shown in FIG. 6a. Grooves "a" of template 114 are used to make A cuts "A" in work-piece "AA" and grooves "b" are used to make cuts "B" in work-piece "BB". It is realized that even though in the example of FIG. 6a, the work-pieces are of the same thickness, the work-pieces "AA" and "BB" may be of different thicknesses. One may be, for example, ¾" thick and the other 1" thick.

Figure 3:
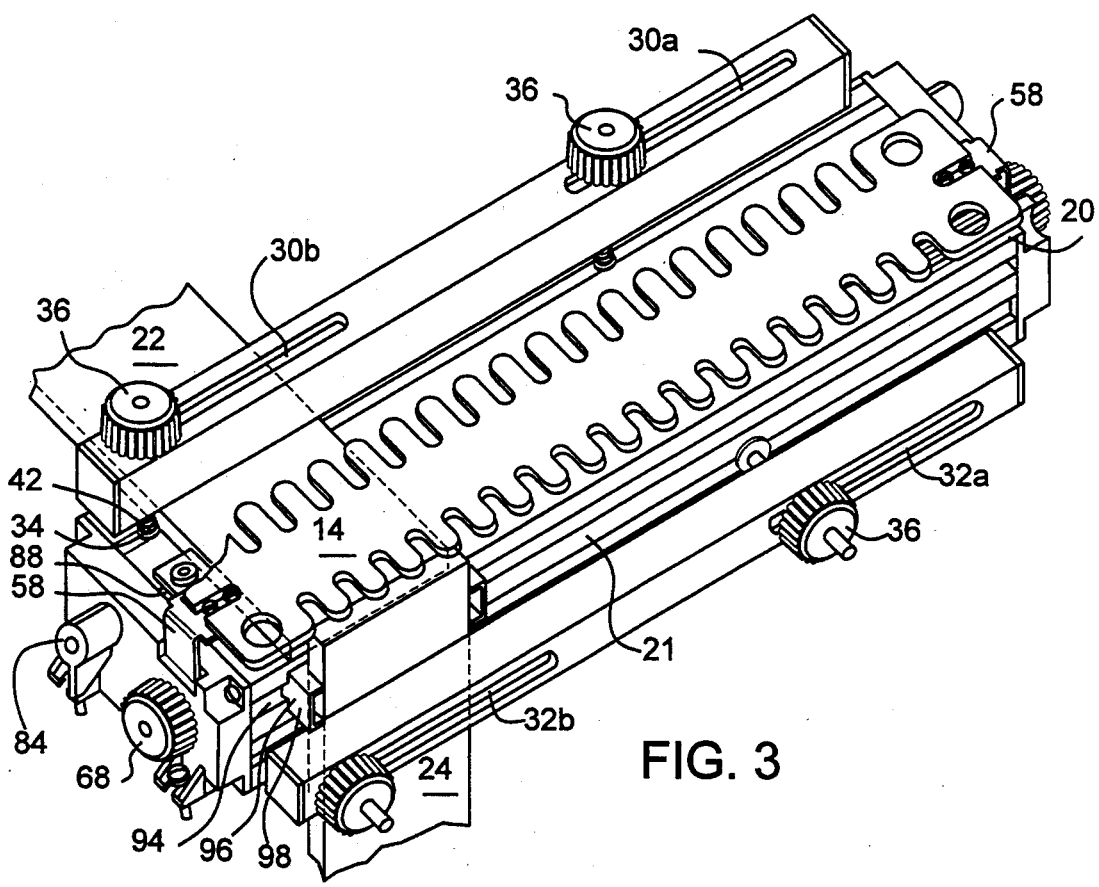
FIG. 3 is a partial perspective view of a preferred embodiment with two work-pieces therein for making a half-blind dove-tail joint.

In making a cut as shown in FIG. 3, knobs 68 are loosened and the template brackets 58 of template 14 are inserted into the openings 72 in housing 50. Upon seating of the brackets 58 onto the mounting bolts 62 and adjusting the spacing between template 14 and top surface 20, bolts 68 are tightened down so the template 14 is held securely thereon.

Clamping devices 16 and 18 are then positioned to receive the work-pieces 22 and 24 therein. The stop blocks 90 and 96 are also moved to their preselected position by loosening bolts 100 prior to movement, then tightening bolts 100 upon location. The inner extremity of top stop block 90 is then located adjacent to the outer extremity of the leg 98 of the front stop block 96 and positioned to provide proper spacing for cutting. The work-pieces 22 and 24 are then positioned with the stop blocks 90 and 96. The vertical work-piece 24 is placed against the inner extremity of leg 98 of the front stop block 96 and the horizontal work-piece 22 is placed against the inner extremity of stop block 90 and aligned with the outer extremity of leg 98 of front stop block 96. The clamping knobs 34 are moved along the openings 30a, 30b, 32a, 32b in the channel-shaped members 26 and 28 until the clamping knobs 34a are on opposite sides and adjacent to the work-pieces 22 and 24. The clamping knobs 34 are then tightened until the work-pieces 22 and 24 are secured. The guide bushing assembly 110, may then be placed in a router (not shown) and with the guide bushing assembly in the router following the template 14, appropriate cuts in the two work-pieces 22 and 24 are made.

Figure 4:
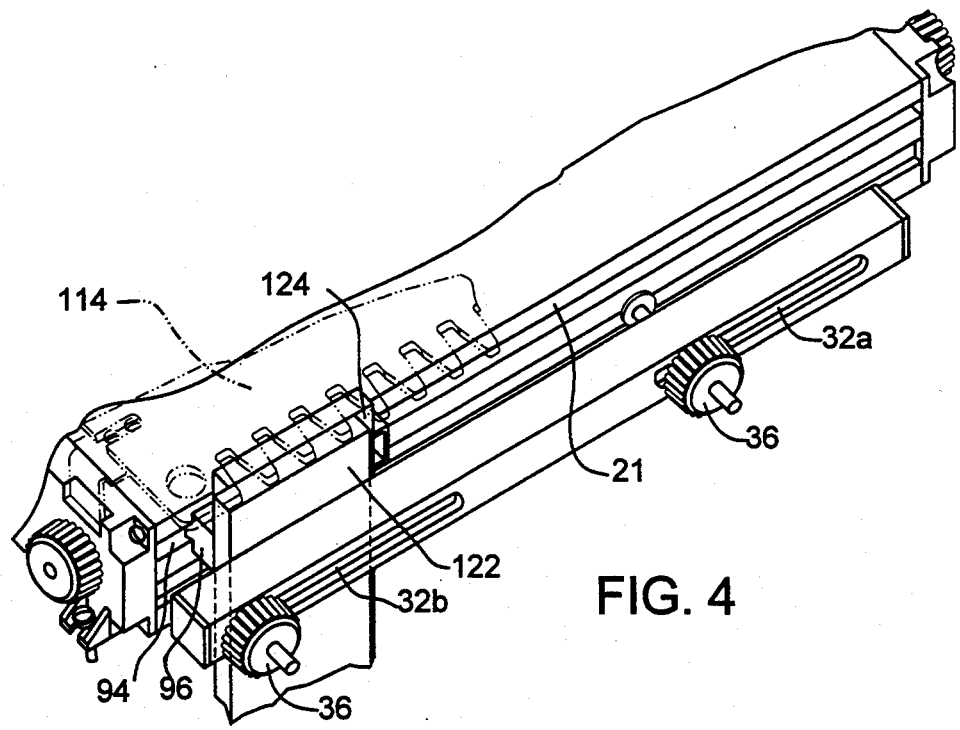
FIG. 4 is a partial perspective view of a preferred embodiment with two work-pieces therein for making an interlocking joint with two types of cuts including a box-cut design.

In making a box-cut with the work-pieces 122 and 124 positioned as shown in FIG. 4, clamping device 16 for the top surface 20 and stop blocks 90 are not utilized. Instead, only the front surface 21 clamping device 18 and stop blocks 96 are used. In positioning the work-pieces in FIG. 4, work-piece 124 is positioned the same as work-piece 24 is positioned in FIG. 3. Work-piece 122 is positioned by aligning its outer edge with the outer extremity of leg 98 of stop block 96.

If fine adjustments are needed for aligning templates 14 and 114 to provide more precise cut depths, merely turning handles 84 on either side of apparatus 10 provides for incremental movements of the templates.

It is realized that varying and different embodiments may be made within the scope of the inventive concept herein described because many modifications may be made to the embodiments herein detailed, but it is to be understood that the details herein are to be interpreted as shown and not to be unduly restrictive of the present invention. Although not specifically described herein, the use of other templates will permit the cutting of various other types and sizes of joints, including, but not limited to, finger-joints, in-line and right angle box joints, dowelled joints, sliding dove-tails, as well as mortises and tenons.

What is claimed is:

1. An apparatus for supporting and guiding a router in cutting work-pieces to form an interlocking joint comprising:
   a base support member;
   a template vertically adjustably connectable to said base support member, said template includes at least one bracket to be received by a template support and positioning means, said template support and positioning means being mounted onto said base support member, said template bracket includes means to vertically and laterally adjust said template;
   a vertical work-piece clamping device mounted onto said base support member including first and second vertical work-piece clamping assemblies, said vertical clamping assemblies being in spaced adjustable relation with each other;
   a horizontal work-piece clamping device mounted onto said base support member including first and second horizontal work-piece clamping assemblies, said horizontal clamping assemblies being in spaced adjustable relation with each other; and,
   means to position said template horizontally in relation to said work-pieces.

2. The apparatus of claim 1, said horizontal work-piece clamping devices abutting said work-pieces when located in a cutting position.

3. The apparatus of claim 1 wherein said vertical work-piece clamping device includes an elongated member having a pair of aligned longitudinally spaced elongated openings therein, each opening receiving a vertical work-piece clamping assembly therein, said openings permitting said vertical clamping assemblies to be positioned adjacent to and abuttable with said work-piece.

4. The apparatus of claim 3, said clamping assembly including a threaded member disposed to extend through said elongated opening and an aligned slotted opening in said support member, said threaded member having an outer end and an inner end, said outer end being attached to a rotatable member, said inner end extending through said slotted opening and being received by a mating threaded female member.

5. The apparatus of claim 1 wherein said vertical work-piece clamping device includes an elongated member having a pair of aligned longitudinally spaced elongated openings therein, each opening receiving a horizontal work-piece clamping assembly therein.

6. The apparatus of claim 5, said clamping assembly including a threaded member disposed to extend through said elongated opening and an aligned slotted opening in said support member, said threaded member having an outer end and an inner end, said outer end being attached to a rotatable member, said inner end extending through said slotted opening and being received by a mating threaded female member.

7. The apparatus of claim 1, said base support member including a plurality of template support and positioning means, said template support and positioning means being on opposite sides of said base support member.

8. The apparatus of claim 1, said template support and positioning means including a horizontal movable plate, said horizontal movable plate having said template bracket detachably connected thereto.

9. The apparatus of claim 1, said template bracket having a vertically extending L-shaped portion with an open-ended slit at its lower extremity, said template support and positioning means including a horizontally extending shaft to receive said open-ended slit thereon, the positioning of said L-shaped portion on said shaft defining the vertical position of said template.

10. The apparatus of claim 1 including positioning means for said work-pieces in relation to said template.

11. The apparatus of claim 10 including positioning means for said work-pieces on a top surface of said base support member and on a front surface of said base support member.

12. The apparatus of claim 11, said positioning means on said front surface including means to position said work-pieces in cutting relation with each other.

* * * * *